US012238061B2

(12) United States Patent
Sivagnanam

(10) Patent No.: US 12,238,061 B2
(45) Date of Patent: Feb. 25, 2025

(54) CHAT-BASED PROACTIVE NUDGING SYSTEM AND METHOD

(71) Applicant: SAP SE, Walldorf (DE)

(72) Inventor: Natesan Sivagnanam, Karamadai (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/880,540

(22) Filed: Aug. 3, 2022

(65) Prior Publication Data
US 2024/0048517 A1   Feb. 8, 2024

(51) Int. Cl.
| | | |
|---|---|---|
| G06F 3/048 | (2013.01) | |
| G06F 15/16 | (2006.01) | |
| G06N 5/00 | (2023.01) | |
| H04L 29/06 | (2006.01) | |
| H04L 51/04 | (2022.01) | |
| H04L 51/18 | (2022.01) | |
| H04L 51/224 | (2022.01) | |

(52) U.S. Cl.
CPC ............ H04L 51/224 (2022.05); H04L 51/04 (2013.01); H04L 51/18 (2013.01)

(58) Field of Classification Search
CPC ........ H04L 51/224; H04L 51/04; H04L 51/18
See application file for complete search history.

(56) References Cited

U.S. PATENT DOCUMENTS

| | | | | |
|---|---|---|---|---|
| 8,065,362 B2 * | 11/2011 | Greven | ............ | G06Q 10/06311 709/204 |
| 8,812,960 B1 * | 8/2014 | Sun | ..................... | G06F 16/2465 715/757 |
| 9,454,726 B1 * | 9/2016 | Yao | .......................... | G06N 5/04 |
| 9,483,806 B2 * | 11/2016 | Hosseini | ............ | G06Q 50/2053 |
| 10,902,323 B2 | 1/2021 | Sivagnanam et al. | | |
| 10,911,387 B1 * | 2/2021 | Al Majid | .............. | H04L 51/043 |
| 10,977,442 B2 | 4/2021 | Sivagnanam et al. | | |
| 11,128,579 B2 * | 9/2021 | Magliozzi | ............... | G06F 40/30 |
| 11,588,913 B1 * | 2/2023 | Castro | ................... | H04L 51/212 |
| 2004/0066924 A1 * | 4/2004 | Wertsberger | .......... | H04M 3/432 379/201.01 |
| 2014/0164951 A1 * | 6/2014 | Gupta | ..................... | G06F 3/048 715/753 |
| 2015/0019662 A1 * | 1/2015 | O'Kane | ............... | G06Q 10/107 709/206 |
| 2017/0099263 A1 * | 4/2017 | Matsuzaki | .............. | H04L 67/12 |
| 2017/0228367 A1 * | 8/2017 | Pasupalak | ......... | G06F 16/90332 |
| 2018/0130334 A1 | 5/2018 | Choi et al. | | |
| 2018/0131645 A1 * | 5/2018 | Magliozzi | ............... | H04L 51/02 |

(Continued)

*Primary Examiner* — Thu V Nguyen
*Assistant Examiner* — Golam Mahmud
(74) *Attorney, Agent, or Firm* — Klarquist Sparkman, LLP

(57) ABSTRACT

A method includes receiving by a chat server a client request from a client device communicating with the chat server. The chat server generates a server response that is transmitted to the client device. A nudge repository is searched for a nudge action based on a set of tokens generated from at least a portion of the client request. In response to finding the nudge action, a user cohort to receive the nudge action is determined. A nudge request including the nudge action and the user cohort is generated and transmitted to the chat server. The nudge action is deployed from the chat server to one or more client devices associated with one or more user identifiers in the user cohort. The nudge action is rendered as a nudge at the one or more client devices.

20 Claims, 12 Drawing Sheets

(56) References Cited

U.S. PATENT DOCUMENTS

| | | | |
|---|---|---|---|
| 2019/0050738 A1* | 2/2019 | Sivagnanam | G06F 16/00 |
| 2019/0347142 A1* | 11/2019 | Yaramada | G06F 9/453 |
| 2019/0394289 A1* | 12/2019 | Lehrian | H04L 67/306 |
| 2020/0175430 A1* | 6/2020 | Kochura | H04L 51/02 |
| 2020/0192978 A1* | 6/2020 | Sivagnanam | G06F 40/284 |
| 2020/0336444 A1 | 10/2020 | Lee et al. | |

\* cited by examiner

CHAT-BASED PROACTIVE NUDGING SYSTEM AND METHOD

FIELD

The field generally relates to automated reminder systems.

BACKGROUND

In many scenarios, such as in enterprise settings, some employees are expected to complete a set of tasks at periodic intervals. These tasks are largely involuntary, and reminders are often needed before action is taken on the tasks. In most cases, the reminders are issued reactively (for example, when the tasks have not been completed) via traditional email-based follow-ups. It would be beneficial to have a mechanism for proactively reminding employees.

DETAILED DESCRIPTION

Example I—Overview

Described herein are technologies that facilitate automatic generation and rendering of nudges on client interfaces based on user interaction with a chatbot. As described herein, a chatbot can be a piece of software that simulates human-like conversations with users via text or audio messages on chat.

In one example use of technologies described herein, a manager can request a list of direct reports who have completed a certain compliance course via a chat interface that is associated with a chatbot. The chatbot receives the request. Before the chatbot responds to the request, a nudging system described herein can intercept the request and automatically determine a task that is related to the certain compliance course and queue the related task for nudging. The nudging system can identify a target audience for the related task and initiate a nudging process that automatically renders a nudge for the related task on the client interfaces of the target audience. The target audience does not have to be limited to the direct reports of the manager. In this way, what began as a request for a task status lookup for a small group by one manager can end up creating nudges for a wider targeted audience to act on their course compliance and completion.

Other examples described herein involve various scenarios related to interaction with a chatbot and resulting rendering of nudges, including user interface element that can be used to launch an executable task specified within the nudge (e.g., to complete a related task).

The technologies described herein are not abstract concepts. In particular, the technologies described herein are not directed to a method of organizing human activity. More particularly, the technologies described herein are computer-implemented technologies that automatically generate and render nudges on client interfaces based on information derived from user interactions with chat interfaces.

Example II—Nudge

In any of the examples herein, a nudge can take the form of a displayed reminder about a desired action, such as completing a task. Thus, the nudge serves as an intervention that gently steers individuals towards a desired action. As described herein, a nudge can prompt a user to do something useful in the context of an ongoing conversation with a chatbot. In some examples, a nudge can be generated for a cohort of users in the context of an ongoing conversation between one of the users in the cohort of users and a chatbot. In some examples, a nudge can be generated when a chatbot provides an incomplete response to a request for pending actions during an ongoing conversation between a user and the chatbot.

Figure 3A:
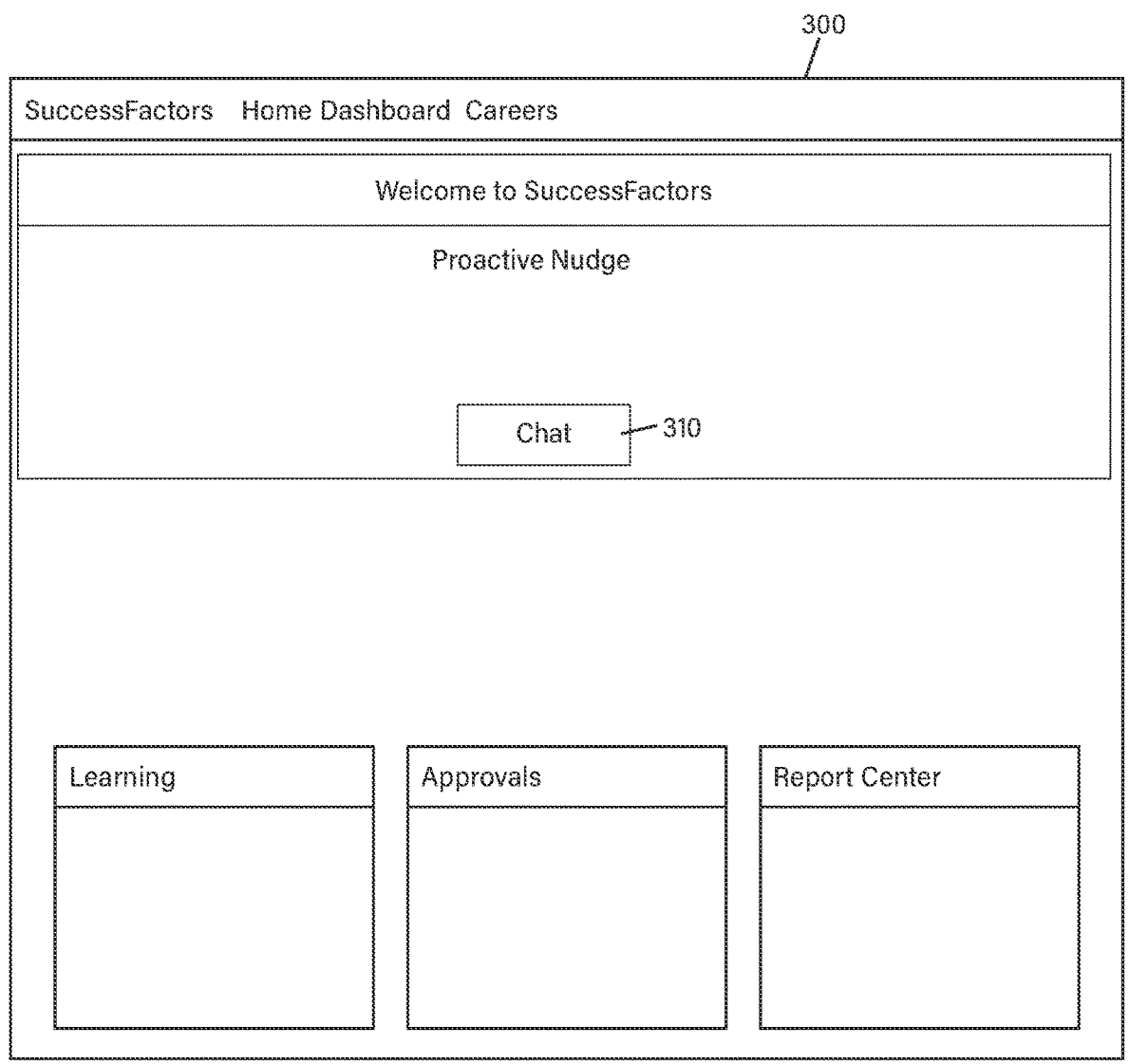
FIG. 3A shows an example of a landing page of a proactive nudging application that can be presented on a chat client.
Figure 3B:
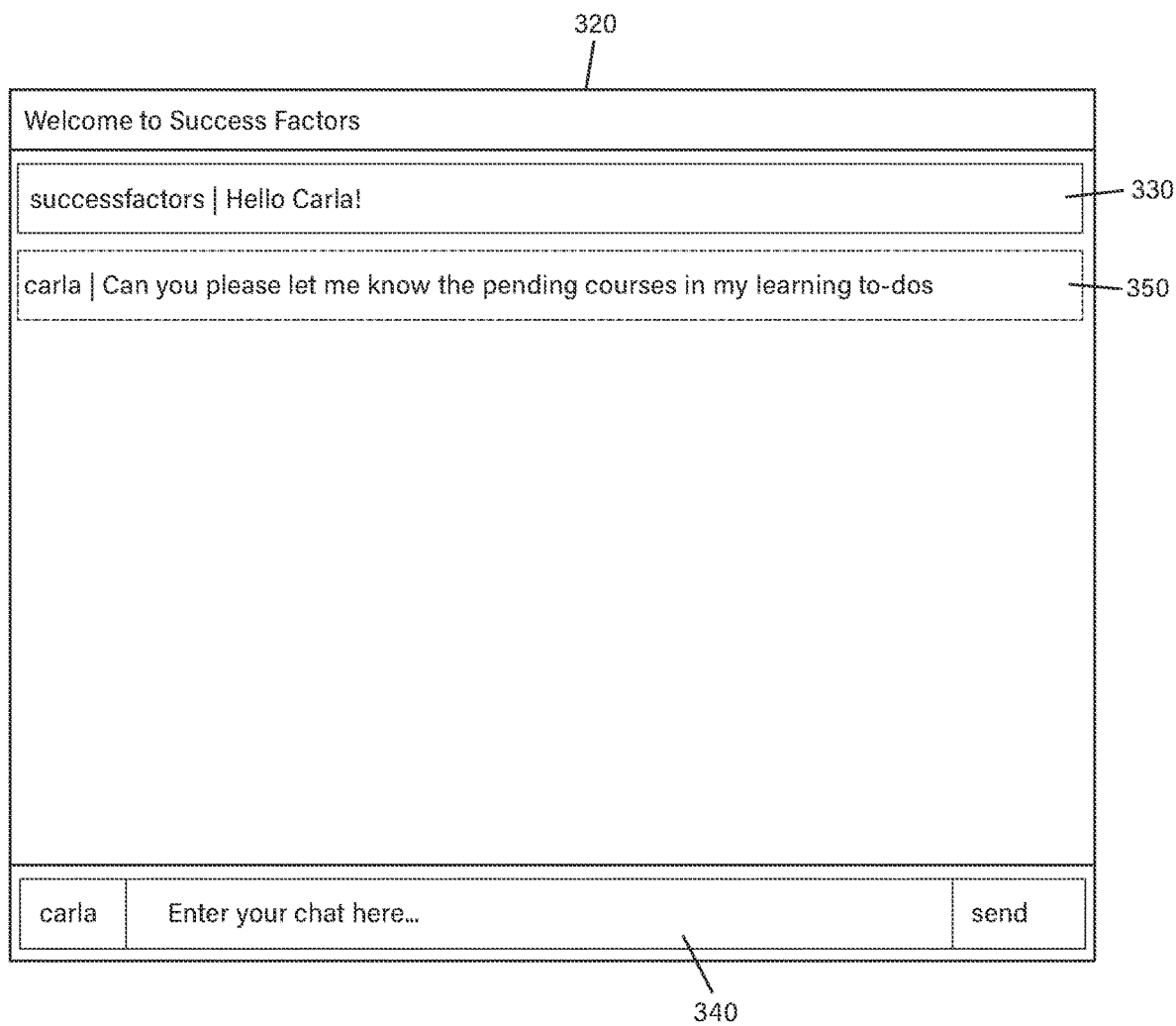
FIG. 3B shows an example of a chat interface that can be displayed by the chat client when a user selects a chat button on the landing page of the proactive nudging application and illustrates a chat message entered by the user in the chat interface.
Figure 3C:
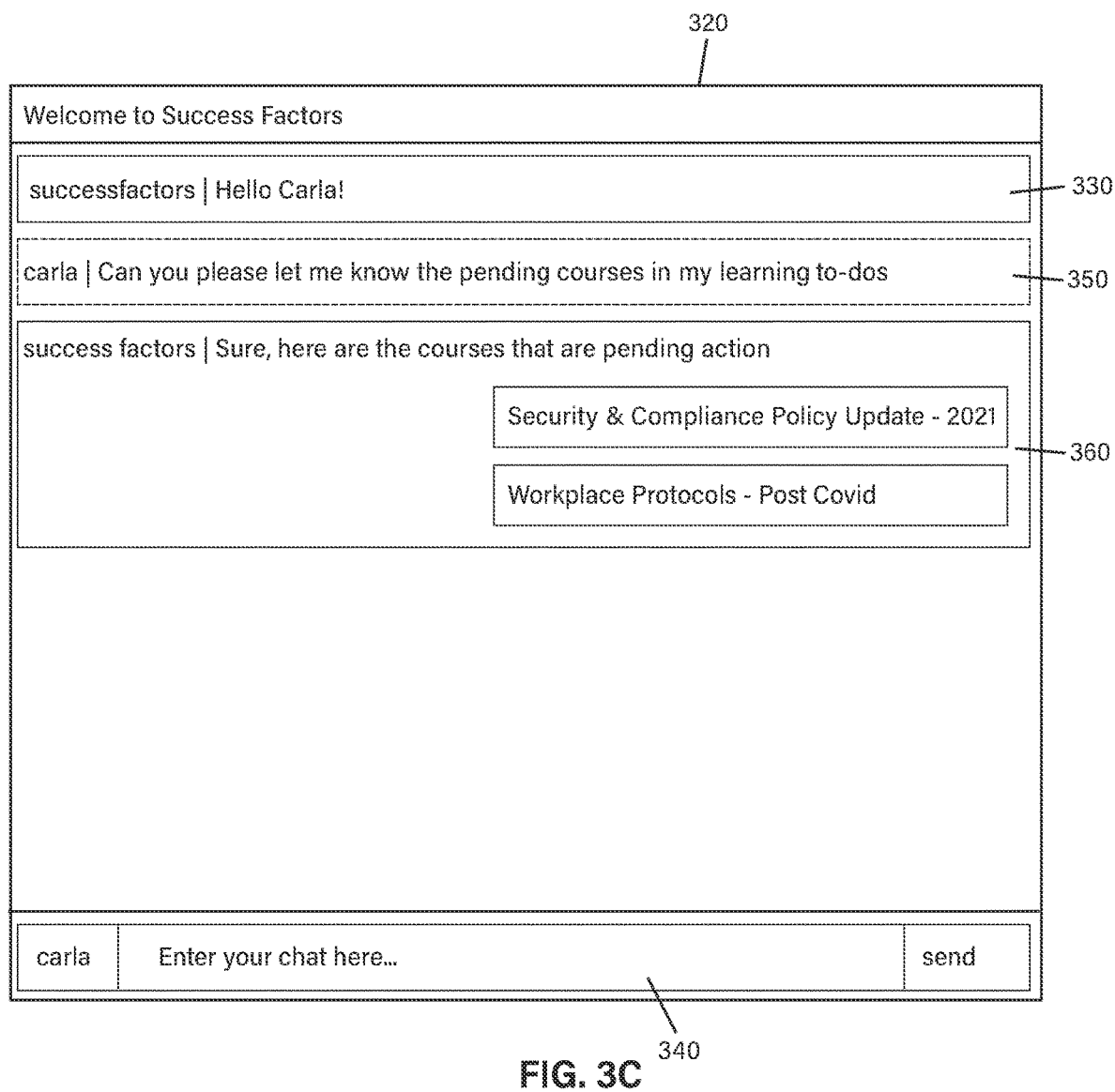
FIG. 3C shows an example of a chat server response that can be displayed on the chat interface of FIG. 3B after the user enters the chat message on the chat interface and illustrates a nudge on the chat interface.
Figure 3D:
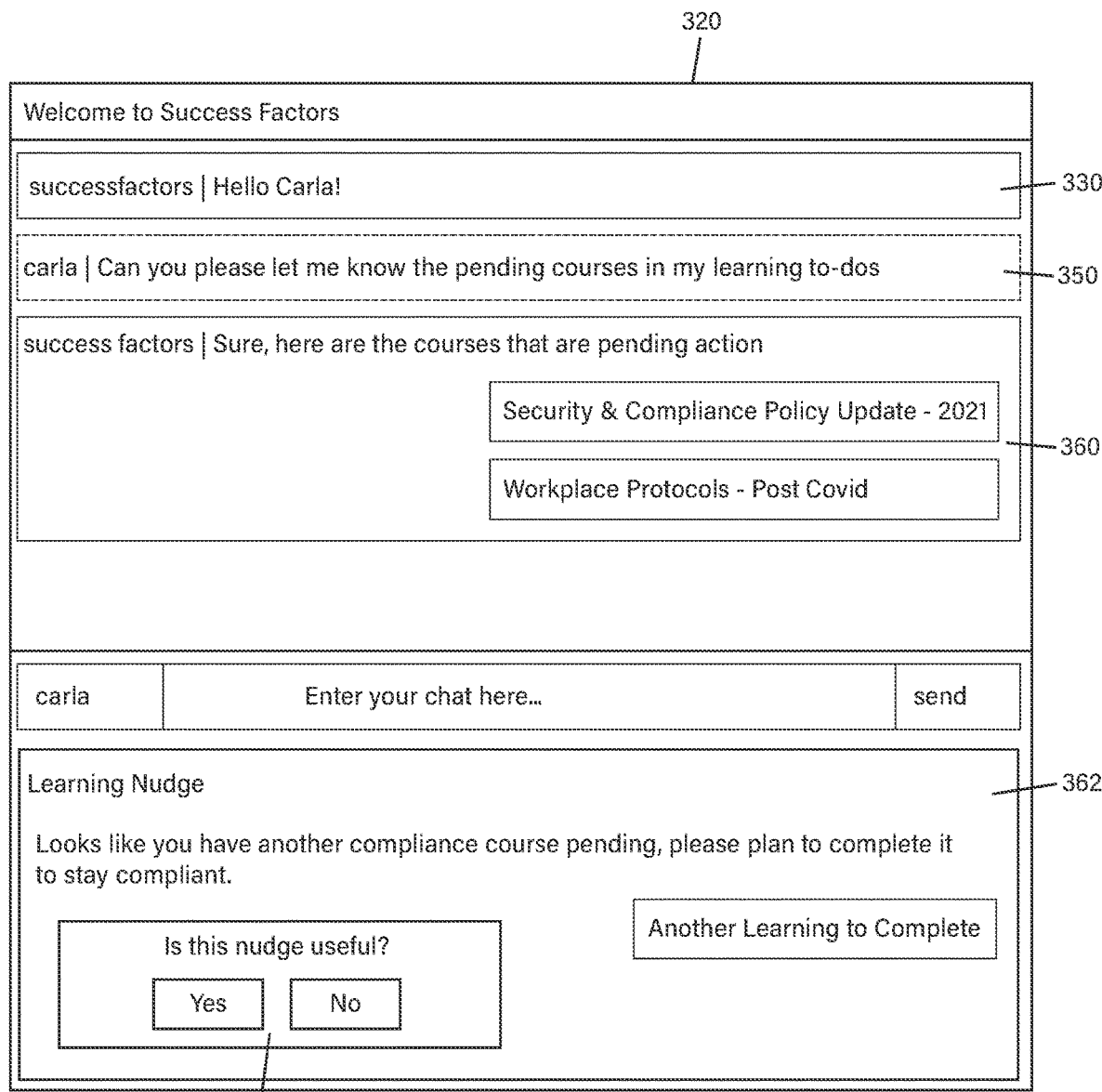
FIG. 3D shows a nudge rendered on the chat interface of FIG. 3C.
Figure 3E:
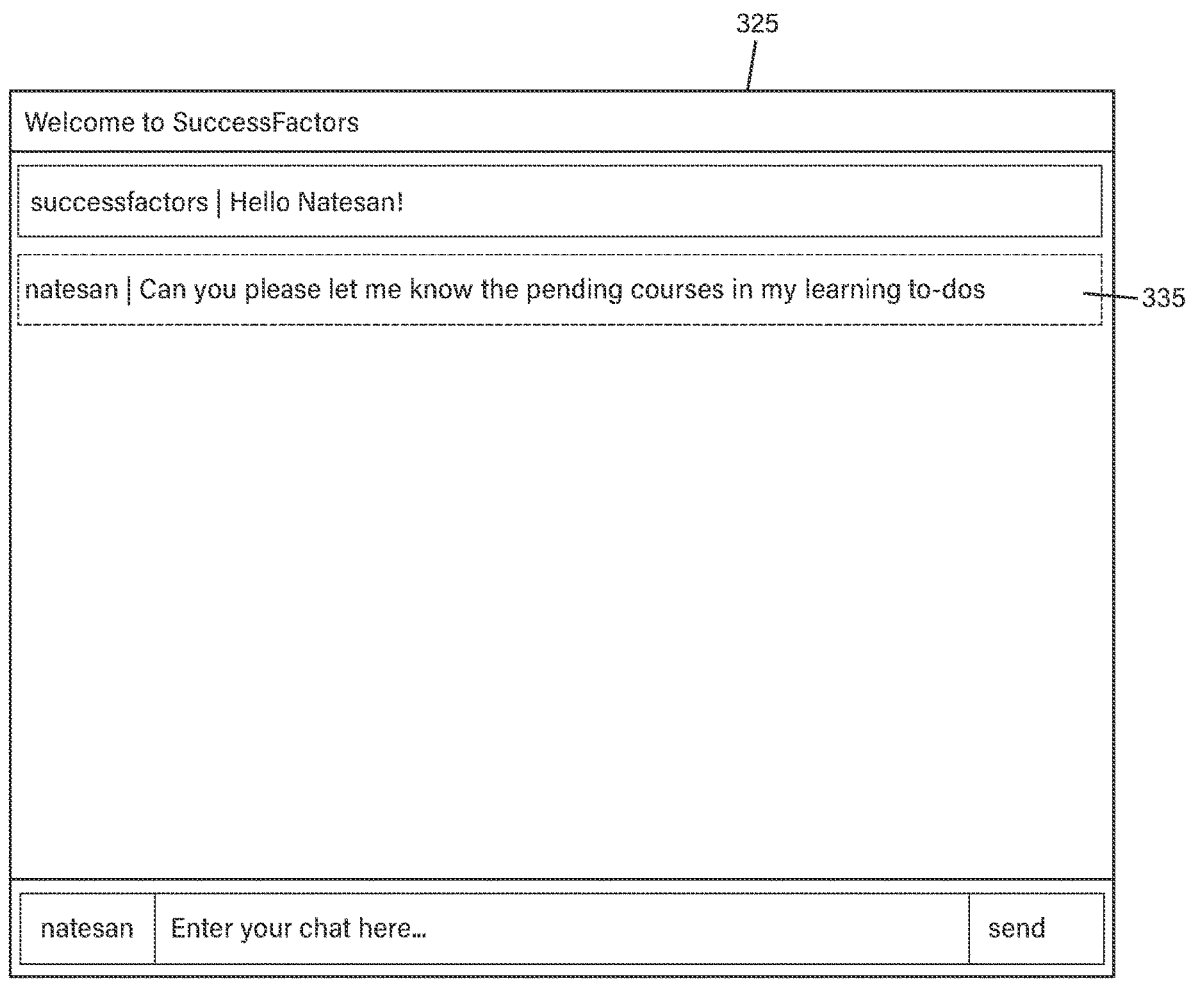
FIG. 3E shows an example of a different user entering a chat message on a chat interface.

In practice, nudges can be rendered at a chat user interface or displayed at a client device by transmitting a nudge action to the client device. The nudge action can include text, user interface elements, and the like related to the associated task. A nudge can then be rendered in a graphical user interface within one or more user interface areas at the client device. The user interface area can be selected and arranged in a way to persuade a user to take an action. For example, the user interface area can be in a highlighted area of a graphical user interface or can be within a pop-up window or dialog box. The user interface elements associated with the nudge can be rendered within the user interface area to allow interaction with the nudge. For example, a selectable (e.g., clickable, tappable, or the like) user interface element such as a pushbutton, link, or the like can be displayed. Responsive to activation of the user interface element, an executable task specified by the nudge can be launched. As shown herein, such executable tasks can be completing online compliance courses or the like. An example of a nudge rendered on a graphical user interface is shown in FIGS. 3D and 3E.

Example III—System Implementing Proactive Nudging

Figure 1:
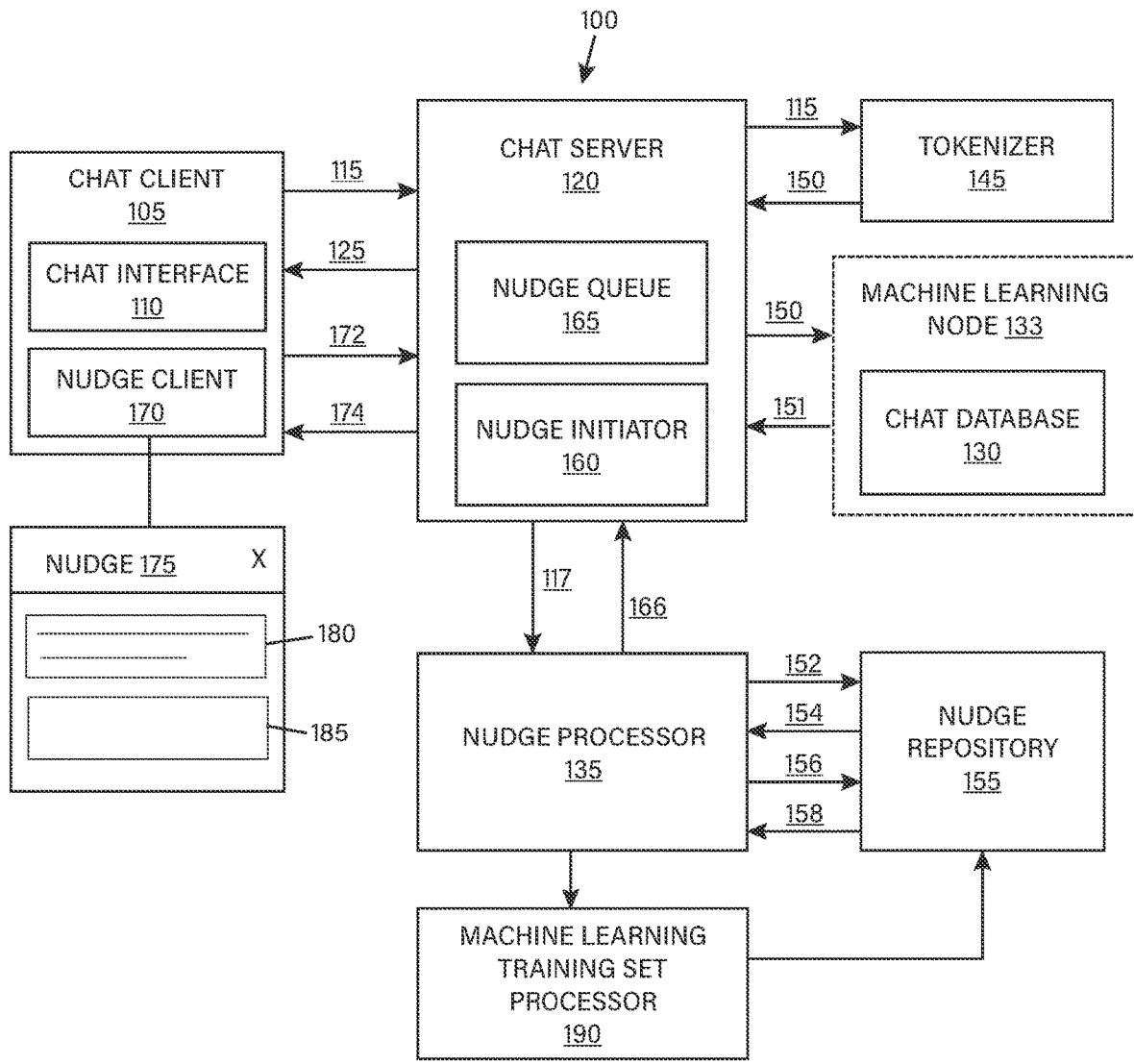
FIG. 1 is a block diagram of an example system implementing proactive nudging.

FIG. 1 is a block diagram of an example system 100 implementing proactive nudging. The system 100 includes a chat subsystem and a nudging subsystem. The chat subsystem includes a chat client 105, a chat server 120, and a chat database 130. The system can have more than one chat client 105 communicating with the chat server 120 over a network. A chat client can be a client that can provide a chat interface through which a user can chat with the chat server. The chat server is a computer or network of computers providing processing power to handle and maintain chat conversations with users. The nudging subsystem includes a nudge processor 135, a nudge repository 155, a nudging initiator 160, a nudge queue 165, and a nudge client 170. The nudge initiator 160 and nudge queue 165 can be installed on the chat server 120. Chat clients 105 communicating with the chat server 120 execute at client devices (such as computers or mobile devices) and can include the nudge client 170 as a component. The nudging subsystem generates nudges for users using chat interaction data from the chatbot subsystem. The nudging subsystem can monitor interaction of users with the nudges and use the interaction to reinforce the nudges.

In the illustrated example, the chat client 105 provides a chat interface 110 (or, more generally, client interface) over which a user can have a conversation with the chat server 120. For example, the user can enter a chat message, such as a question or statement, in the chat interface 110. When the user sends the chat message via the chat interface 110, the chat client 105 can generate a client request 115 including the chat message and user identifying information. The chat interface 110 can transmit the client request 115 to the chat server 120. In some examples, the chat message can be in the form of a text string. In other examples, the user can interact with the chat interface 110 via audio. In the audio case, the chat message can initially be in audio form, which can be converted to a text string (for example, using text-to-speech processing).

The chat server 120 can receive and process the client request 115. In one example, the chat server 120 tokenizes the chat message in the client request 115 to obtain a set of tokens 150. The chat server 120 can generate the set of tokens 150 using a tokenizer 145. In some examples, the tokenizer 145 can receive the client request 115, segment the text string (e.g., the chat message) in the client request 115 into text elements, such as one or more words, while taking into account grammar, syntax, and user sentiment. The tokenizer 145 can output some or all of the text elements as tokens. For example, the text elements corresponding to adjectives, nouns, and verbs can be outputted as tokens while other text elements are filtered out. In some cases, the tokenizer 145 can further filter out extraneous text elements, for example, text elements expressing pleasantries (such as, "please").

The chat database 130 stores user information, client requests, and token-to-action mappings. A token can be a word or a group of words. A token-to-action mapping identifies a relationship between an action and a specific set of tokens. The action can be, for example, an application programming interface (API) that can be accessed from via uniform resource locator (URL). The token-to-action mappings can be configured through an appropriate API configuration page and stored in the chat database 130. Table 1 shows an illustrative example of configuring token-to-action mappings.

TABLE 1

| Description | Token | Action (URL mapping) |
|---|---|---|
| Show the weather in the specified locality (like Delhi). | show, weather | /api/v1/checkWeather |
| Email specified content to a user. Emails the specified content to the intended user. | email, content | /api/v1/sendEmail |
| List upcoming courses depending on the subject area specified. This checks the Catalog of the User and fetches the course details. | list, upcoming courses | /learning/api/v1/courses |
| Display the interns joining in the specified time period (like 30 days). | display, interns | /recruiting/api/v1/joiningCatalog |

In some examples, the chat database 130 can store other types of data, such as user to-dos and tasks, user profile (e.g., demographics, work profile, educational profile, skills, preferences), peer group interaction data, and a peer jargon library.

The chat server 120 can search for a token-to-action mapping in the chat database 130 that matches the set of tokens 150. In some examples, the chat database 130 can be part of a machine learning node 133, which can take the set of tokens 150 and search for stored tokens that match the set of tokens 150. When the stored tokens are found, the machine learning node 133 can obtain the action mapped to the matching stored tokens. For example, in the illustrated Table 1, if the set of tokens 150 is {"show", "weather"}, the action would be "/api/v1/checkWeather". The machine learning node 133 can incorporate context into the search such that relevant stored tokens can be found even when there are no exact stored tokens that match the set of tokens 150. In some cases, the machine learning node 133 can perform jargon analysis on the set of tokens (for example, using user profile, peer group interaction data, and peer jargon library stored in the chat database 130) and evaluate the user to-dos and tasks for time context. Additional functionality for contextual searching in a chat framework can be incorporated.

The chat server 120 can receive an action 151 that matches the set of tokens 150 from the chat database 130 or the machine learning node 133. The chat server 120 can execute the action 151 (for example, make an API call). The chat server 120 can generate a server response 125 to the client request 115 based on the result of executing the action 151. The chat server 120 can return the server response 125 to the chat client 105, which can present the server response 125 to the user on the chat interface 110.

The chat server 120 can store the client request 115 in the chat database 130. In some examples, for privacy of the user, the chat server 120 stores an anonymized version of the client request 115 in the chat database 120 (e.g., a version of the client request 115 that is stripped of user identifying information). In some examples, the chat server 120 stores the anonymized version of the client request 115 in the chat database 120 only if the user has consented to proactive nudging.

The nudge processor 135 is a computer or network of computers providing processor power to handle and maintain nudge related interactions with users. The nudge processor 135 polls (e.g., checks at regular intervals) the chat server 120 for any tokens from user conversations and updates the nudge repository 155 with the tokens.

The nudge processor 135 can receive a tokenized request 117 including the set of tokens 150 generated by the tokenizer 145 and the user information (e.g., user identifier) associated with the client request 115 from the chat server 120. The nudge processor 135 can determine a nudge action based on the set of tokens 150 in the tokenized request 117.

The nudge repository 155 stores tokens, actions (or nudge actions), token-to-action mappings (mappings between tokens and nudges), and user cohorts. A user cohort includes user identifiers of selected individuals in an organization. The individuals included in a user cohort can be determined based on the skills of the individuals and/or based on a relationship in a management structure of the organization. In some examples, the user cohort can be limited to user identifiers that have consented to be nudged by the system. A user cohort in the nudge repository 155 can be associated with an action in the nudge repository 155. Once a baseline of user cohorts has been established, the user cohorts can be modified based on the actions with which the user cohorts are associated. A user cohort can have a weight that indicates the degree of relevance of the user cohort to the action with which the user cohort is associated. In cases where multiple user cohorts in the nudge repository 155 are associated with a particular action in the nudge repository, the weights of the user cohorts can be used to select a best matching user cohort for the particular action (e.g., for the purpose of nudging a user cohort). For illustrative purposes, Table 2 shows a data structure of the nudge repository with example data.

TABLE 2

| Tokens | pending, courses, complete |
|---|---|
| Actions | find pending learning, find new hires |
| Mapping | courses > find pending learning |
| User cohorts | users with pending learning courses, users with joining date less than 6 months |

Prior to use of the system 100, an initial set of token-to-action mappings can be configured and stored in the nudge repository 155. The token-to-action mappings can be configured using an API configuration page as illustrated in Table 1, for example. The number of token-to-action mappings in the nudge repository 155 can indicate the number of nudges that the system is capable of making. As the system learns from user interaction data, additional token-to-action mappings can be added to the nudge repository 155. An initial set of user cohorts can be configured and stored in the nudge repository 155 in association with actions stored within the token-to-action mappings. During use of the system 100, additional user cohorts can be generated to add to the nudge repository 155, or existing user cohorts in the nudge repository 155 can be updated based on reinforcement data. In some examples, the nudge processor 135 can keep track of the successful interactions that occur during a conversation between the chat client 105 and the chat server 120. For example, when the user asks the chat server for information and receives the requested information from the chat server, this interaction between the user and chat server can be considered to be successful. Potential actions can be extracted from the successful interactions (e.g., from the requested information provided by the chat server). The potential actions can be added to the nudge repository 155 through the machine learning training set processor 190 and mapped to the appropriate tokens that do not have corresponding actions.

The nudge repository 155 can receive a request 152 from the nudge processor 135 for a nudge action. The request 152 can include a set of tokens (which includes at least a subset of the tokens in the tokenized request 117). The nudge repository 155 can process the request 152 and return a response 154 to the nudge processor 135. To generate the response 154, the nudge repository 155 can search for a token-to-action mapping that matches the set of tokens in the request 152. The search can be based on a degree of similarity between the set of tokens in the request 152 and the tokens in the token-to-action mappings stored in the nudge repository 155. If a matching token-to-action mapping is found, the response 154 can include the token-to-action mapping. If the response 154 includes a token-to-action mapping, the nudge processor 135 can determine the nudge action from the token-to-action mapping. If the response 154 does not include a token-to-action mapping, the nudge processor 135 can request the nudge repository 155 to store the set of tokens in the tokenized request 117. The system can learn an action that matches the stored set of tokens and update the nudge repository to include the corresponding token-to-action mapping.

The nudge repository 155 can receive a request 156 from the nudge processor 135 for a user cohort to receive a nudge action. The request 156 can include the nudge action. Since user cohorts are associated with actions, the nudge repository 155 can find the user cohort that matches the nudge action in the request 156 and return a response 158 to the nudge processor 135. To generate the response 158, the nudge repository 155 can search for user cohorts that correspond to the nudge action. User cohorts have associated weights. Initially, the user cohorts can be assigned default weights. These weights can be adjusted based on feedback on nudges. If the nudge repository 155 finds multiple user cohorts that correspond to the nudge action, the nudge repository 155 can rank the user cohorts by weight and select the user cohort with the highest weight to include in the response 158. If the response 158 does not include a user cohort, the nudge processor 135 can generate a user cohort that includes the current user (that is, the user indicated in the tokenized request 117). The nudge processor 135 can further analyze the nudge action and current user and add other users to the user cohort based on the nudge action and current user. For example, if the nudge action indicates a legal compliance nudge (e.g., the current user is a lawyer and needs more CLE credits to be compliant for the year), the nudge processor 135 can determine other lawyers who need additional CLE credits and add the other lawyers to the newly generated user cohort. The nudge processor 135 can store the newly generated user cohort in the nudge repository 155 in association with the nudge action.

The nudge processor 135 can initiate a nudging workflow based on the nudge action and user cohort and consent of the users in the user cohort to receive nudging. After the nudge processor 135 has determined that the users in the user cohort have consented to nudging, the nudge processor 135 can initiate the nudging workflow by generating a nudge request 166 and transmitting the nudge request 166 to the chat server 120. The nudge request 166 can include the nudge action and the user cohort to receive the nudge action. The nudge initiator 160 can receive the nudge request 166 and push the nudge request 166 onto the nudge queue 165. The nudge initiator 160 can be logic that facilitates updating the nudge queue 165. In some examples, the nudge initiator 160 can be a microservice that communicates with the nudge processor 135 and is consistently updating the nudge queue 165 to hold a valid set of nudge requests.

A user can have a client device in which the nudge client 170 is installed. In one example, the nudge client 170 can poll 172 the chat server 120 for messages. For example, the chat server 120 can be polled once per day, once per hour, or once every few seconds (such as 10 seconds). During such polling, the nudge initiator 160 can poll the nudge queue 165 for a nudge action for the current user of the nudge client 170. If there is a nudge action on the nudge queue 165 for the current user, the nudge initiator 160 can send a response 174 including the nudge action to the nudge client 170. In another example, the nudge initiator 160 can automatically deploy the nudge action for a user to a client device in which the nudge client 170 is installed via push notification.

When the nudge client 170 receives a nudge action from the nudge initiator (either via polling or push notification), the nudge client 170 can render (or display) a nudge 175 on the client device using information in the nudge action. For example, the nudge client 170 can render a nudge 175 including a text element 180 and a selectable element 185 (such as a button) using information from the nudge action. For example, the text element 180 can be based on a descriptor in the nudge action, and the destination of the selectable element 185 can be based on an address of a resource in the nudge action.

The interaction of the user with the nudge 175 can be monitored by the nudge client 170. For example, the nudge client 170 can inquire from the user whether the user finds the nudge useful. The nudge client 170 can also detect if the user selects the selectable item 185 of the nudge 175 within a predetermined timeframe. The nudge client 170 can periodically send user feedback to the nudge initiator 160, which can then communicate the user feedback to the nudge processor 135. The user feedback can, in some examples, include information about whether the user found the nudge 175 useful, information about whether the user interacted with the nudge 175 within a predetermined timeframe, and user identifying information.

The nudge processor 135 can determine whether the user feedback is positive or negative. For example, if the user feedback indicates that the nudge 175 is useful and the user interacted with the nudge 175 within the predetermined timeframe, the nudge processor 135 can determine that the user feedback is positive. On the other hand, if any of these conditions fail, the nudge processor can determine that the user feedback is negative. The user feedback, the tokens, and the corresponding nudge action can form reinforcement data that can be used to update the nudge repository 155.

The machine learning training set processor 190 contains a process that takes into account reinforcement data from the nudge processor 135 and existing data from the chat database 130 and incrementally adds user reinforcement data to the nudge repository 155. The machine learning training set processor 190 can use the reinforcement data to determine if the weight of an existing user cohort associated with a particular nudge action should be incremented or decremented and if a new user cohort should be created for a particular nudge action. Based on the reinforcement data from the nudge processor 135 and the existing data from the chat database 130, the machine learning training set processor 190 can also find potential nudge actions for tokens stored in the nudge repository 155 and not mapped to actions.

In one example, for illustrative purposes, if a nudge related to a security compliance course has a positive user feedback, the machine learning training set processor 190 may determine from reinforcement data that the weight of the user cohort associated with the nudge action should be incremented (the weight can be a default weight associated to the user cohort or a weight that has been adjusted in response to feedback). In addition, if the user that provided the positive feedback is on the sales team, for example, the machine learning training set processor 190 may create a new user cohort that includes users from the existing user cohort and new users from the sales team and assign a higher weight to the new user cohort. On the other hand, if the nudge related to the security compliance course has a negative feedback, the machine learning set processor 190 may determine from reinforcement data that the weight of the user cohort associated with the nudge action should be decremented. In addition, if the user that provided the negative feedback is on the sales team, for example, the machine learning training set processor 190 may create a new user cohort that includes users from the existing user cohort with the exception of users from the sales team.

The chat subsystem can be implemented in a bot framework (for example, the chat server 120 can be a chatbot). Technologies supporting bot frameworks can be incorporated. The various components of the nudging subsystem include computer-executable instructions stored in one or more computer-readable media (e.g., storage or other tangible media) or stored in one or more computer-readable storage devices). The technologies described herein can be generic to the specifics of operating systems or hardware and can be applied in any variety of environments to take advantage of the described features.

Example IV—Method of Proactive Nudging

Figure 2A:
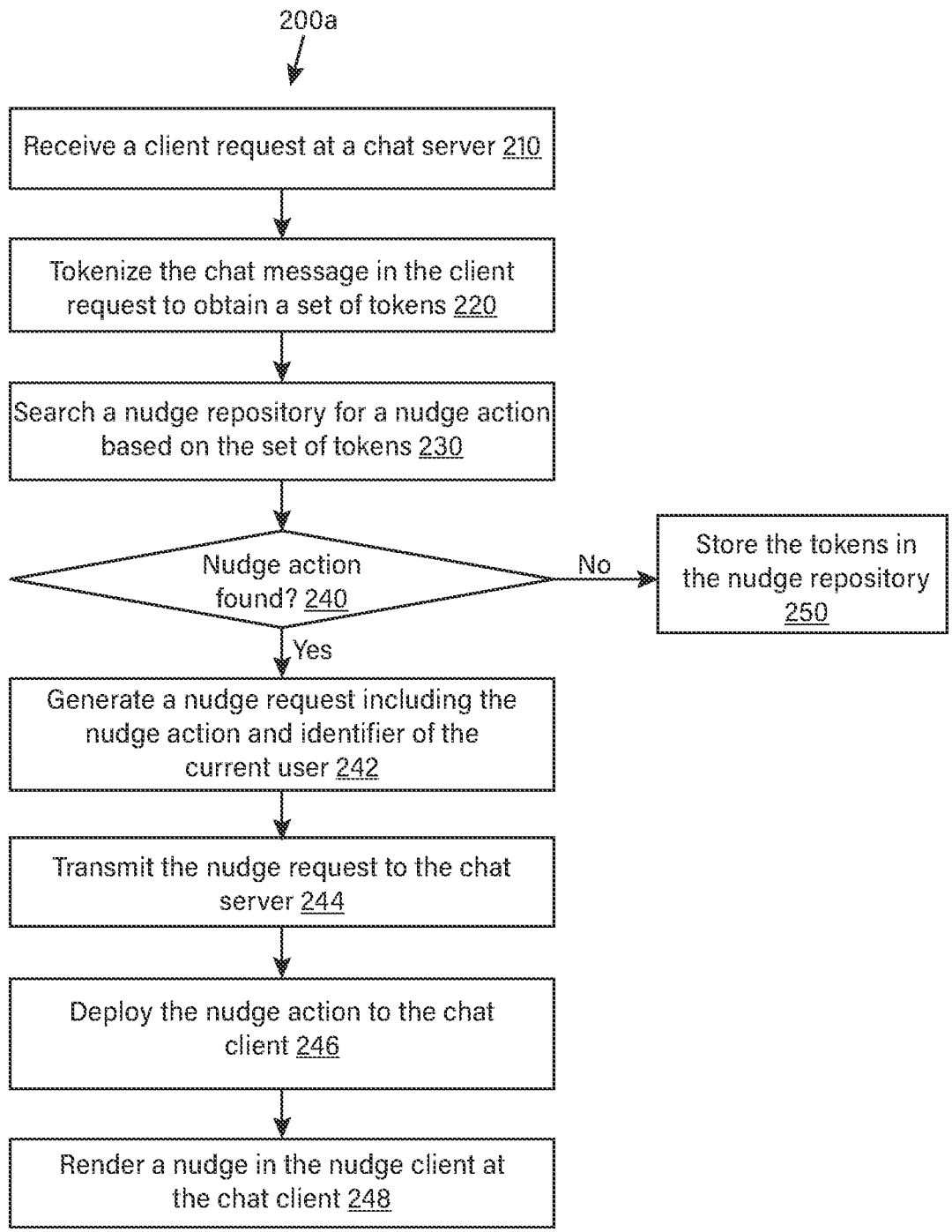
FIG. 2A is a flowchart of a method of proactive nudging.

FIG. 2A is a flowchart of an example method 200a of proactive nudging. The method 200a can be implemented using the system 100 in FIG. 1. Operations are illustrated once and in a particular order in FIG. 2A, but the operations may be reordered and/or repeated as desired and appropriate (for example, different operations illustrated as performed sequentially may be performed in parallel as suitable).

At 210, a chat server receives a client request from a chat client. The client request can be generated in response to a user sending a chat message from a chat interface provided by the chat client. The client request can include the chat message and information that identifies the user. For example, FIG. 3A illustrates an example landing page 300 of an application that can be presented on a chat client (or client device). A user can select the chat button 310 to access a chat interface. FIG. 3B illustrates an example chat interface 320 presented on the chat client after the user selects the chat button 310. In a portion 330 of the chat interface 320, the application (named "SuccessFactors" for illustrative purposes) greets the user (named "Carla" for illustrative purposes. The user can enter a question in a chat area 340 of the chat interface. After the user clicks the send button in the chat area 340, the question is shown at 350 and a client request is transmitted to the server with the question asked by the user.

Returning to FIG. 2A, at 220, the chat server generates a set of tokens based on the chat message in the client request. For example, a tokenizer on the chat server or in communication with the chat server can receive the client request as input and generate the set of tokens based on a text string (or the chat message) in the client request. For example, the tokenizer can segment the text string into text elements (for example, words) and analyze the text elements to generate the tokens. An example of a text string could be "Show the weather in Delhi". The tokens can be "show" and "weather". Another example of a text string can be "Display interns joining in 30days". The tokens might be "display" and "interns". The chat server can generate a response to the client request based on the set of tokens and transmit the response to the chat client. FIG. 3C shows the chat interface 320 with a response from the chat server displayed at 360.

At 230, the method can include searching a nudge repository for a nudge action corresponding to the set of tokens. In one example, a nudge processor obtains the set of tokens generated by the chat server from the client request. The nudge processor can also obtain the user identifier associated with the client request. The nudge processor requests a token-action mapping that matches the set of tokens from the nudge repository. The nudge repository returns a response to the nudge processor. If the nudge repository finds a matching token-action mapping, the response includes the matching token-action mapping. The nudge processor can infer the nudge action from the matching token-action mapping.

If a nudge action is not found (for example, because the response from the nudge repository did not include a matching token-action mapping), as determined at 240, the nudge processor can request the nudge repository to store the tokens, as indicated at 250. The method can include subsequently finding potential actions that can be mapped to the tokens. For example, successful interactions that occur during the conversation between the chat client and the chat server can be tracked and used to determine potential actions to map to the tokens. For example, when the user asks the chat server for information and receives the requested information from the chat server, this interaction between the user and chat server can be considered to be successful. Potential actions can be extracted from the successful interactions (e.g., from the requested information provided by the chat server). The potential actions can be added to the nudge repository 155 through the machine learning training set processor 190 and mapped to the appropriate tokens that do not have corresponding actions.

At 242, the method includes generating a nudge request including the nudge action found in operation 230 and user identifier for the current user. In some cases, the method determines whether the current user has consented to nudging prior to generating the nudge request.

At 244, the method includes transmitting the nudge request to the chat server. In one example, the nudge processor transmits the nudge request to the chat server. In some examples, the nudge initiator can receive the nudge request and add the nudge request to a nudge queue on the chat server.

At 246, the method can include deploying the nudge action from the chat server to the chat client. In some examples, the nudge initiator automatically deploys the nudge action to the chat client after the chat server receives the nudge request. In other examples, a nudge client on the chat client (or a different client device that the current user is on) polls the chat server for messages. In response to the polling, the nudge initiator polls the nudge queue for a nudge action for the current user at the chat client. If there is a nudge action for the current user, the nudge initiator deploys the nudge action to the chat client.

At 248, the method includes rendering a nudge at the chat client based on the nudge action deployed to the chat client. For example, the nudge client at the chat client can receive the nudge action deployed by the nudge initiator. The nudge client can generate a nudge based on the nudge action and using one or more user interface elements. The nudge can be displayed alongside a response sent to the chat client by the chat server. For illustrative purposes, FIG. 3D shows a learning nudge 362 deployed for the current user at the chat interface 320 together with the response from the chat server.

In the example given in FIGS. 3A-3D, the user is chatting about compliant courses and a nudge related to a compliant course is rendered. In other examples, the user could be chatting about a different topic (for example, how many days of vacation can be taken), and a nudge related to a compliant course that has not been completed can be rendered. In this case, tokens related to finding vacation days have been mapped to a nudge action to find pending learning. Therefore, the token-to-action mappings stored in the nudge repository can be designed to capture various nudging scenarios.

The method 200a can be illustrated from alternative perspectives, e.g., from a perspective of an end user, which can be a human or a computer system or a process. The method 200a or any methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

Example V—Method of Proactive Nudging with a User Cohort

Figure 2B:
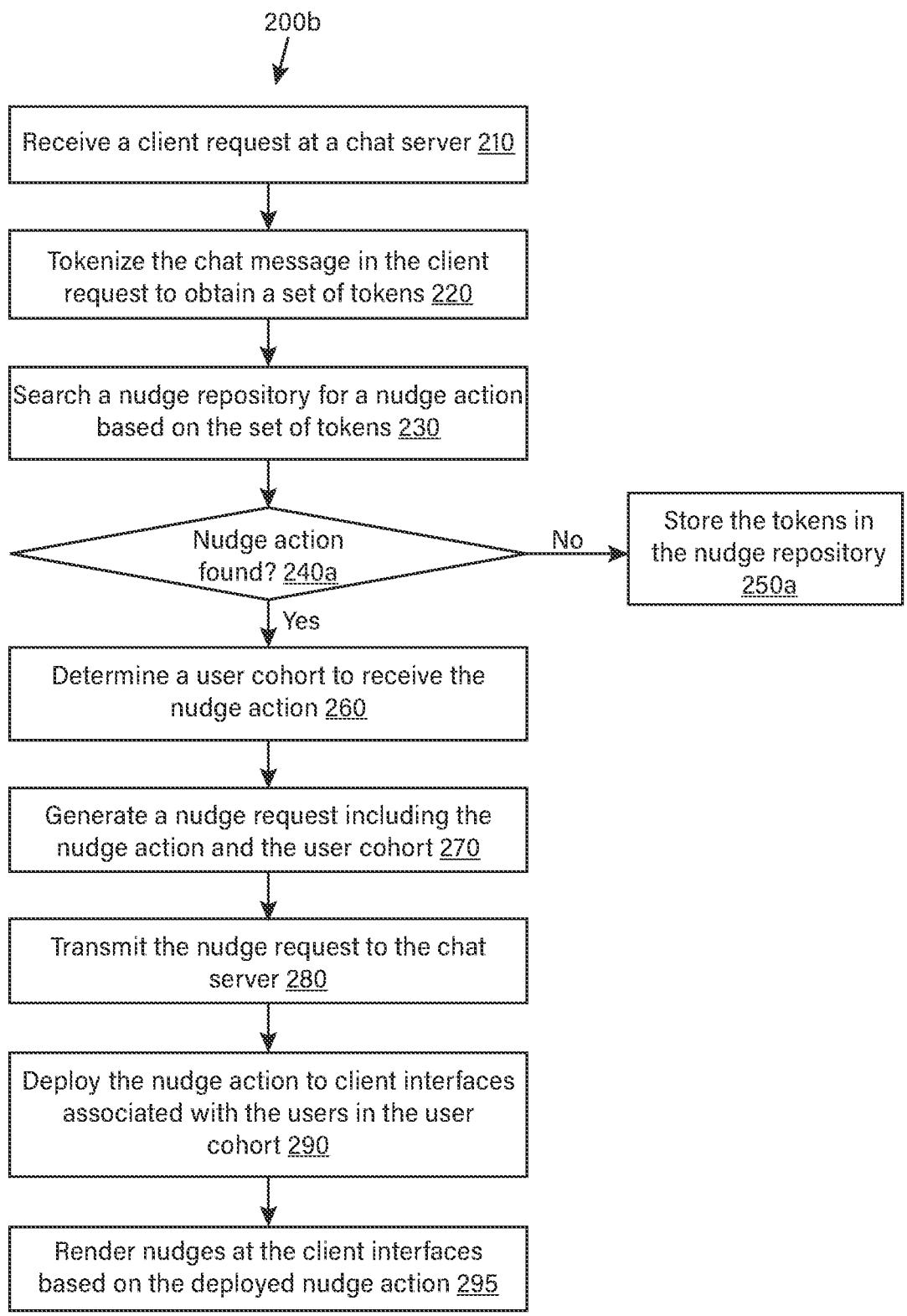
FIG. 2B is a flowchart of a method of proactive nudging with a user cohort.

FIG. 2B is a flowchart of an example method 200b of proactive nudging with a user cohort. Operations are illustrated once and each and in a particular order in FIG. 2B, but the operations may be reordered and/or repeated as desired and appropriate (for example, different operations illustrated as performed sequentially may be performed in parallel as suitable).

The method 200b includes the operations 210, 220, and 230 as described in Example IV.

At 240a, the method determines if a nudge action is found. If a nudge action is found, the method continues to operation 260. If a nudge is not found, at 250a, the nudge processor can store the tokens in the nudge repository (as described for operation 250 in Example IV).

At 260, the method includes determining a user cohort to receive the nudge action. In one example, the nudge processor can request a user cohort from the nudge repository based on the nudge action found in operation 230 (described in Example IV). The nudge repository can search for one or more user cohorts that match the nudge action. If multiple user cohorts are found, the nudge repository can select one of the user cohorts (for example, by ranking the user cohorts by weight and selecting the highest ranking user cohort). If the nudge repository finds a user cohort, the nudge repository can return the user cohort to the nudge processor. If the nudge repository does not find a user cohort, the nudge processor can create a new cohort. The new cohort can include the current user. If the client request holds a reference to a group of users, the new cohort can additionally include the group of users.

At 270, the method includes generating a nudge request. The nudge processor can use the nudge action found in operation 230 (described in Example IV) and the user cohort determined in operation 260 to generate the nudge request. In some cases, the method determines whether the user cohort includes the current user prior to generating the nudge request. In some cases, the method further determines whether the users in the user cohort have consented to nudging prior to generating the nudge request. In some cases, the method only generates the nudge request if the current user is included in the user cohort and the users in the user cohort have consented to nudging.

At 280, the method includes transmitting the nudge request to the chat server. In one example, the nudge processor transmits the nudge request to the chat server. At the chat server, the nudge initiator can receive the nudge request and add the nudge request to a nudge queue on the chat server.

At 290, the method includes deploying the nudge action from the chat server to the client interfaces associated with the users in the user cohort determined in operation 270. For the user associated with the client request at operation 210 (described in Example IV), the client interface can be the chat interface provided by the chat client. The nudge action can be deployed to the client interfaces associated with the users in the user cohort synchronously or asynchronously. In some examples, the nudge initiator on the chat server can automatically deploy the nudge action to the client interfaces of the users (the users can be notified, for example, via push notification). In other examples, a nudge client on a client interface x polls the chat server for messages. In response to the polling, the nudge initiator polls the nudge queue for a nudge action for the current user u at the client interface x. If there is a nudge action for the current user u, the nudge initiator deploys the nudge action to the client interface x.

At 295, the method includes rendering a nudge at a client interface based on the nudge action deployed to the client interface. In one example, the nudge client at a client interface receives the nudge action deployed by the nudge initiator. The nudge client generates a nudge based on the nudge action and using one or more user interface elements. In the case of the current user in operation 210 (described in Example IV), the nudge can be displayed alongside a server response sent to the chat client by the chat server.

Figure 3F:
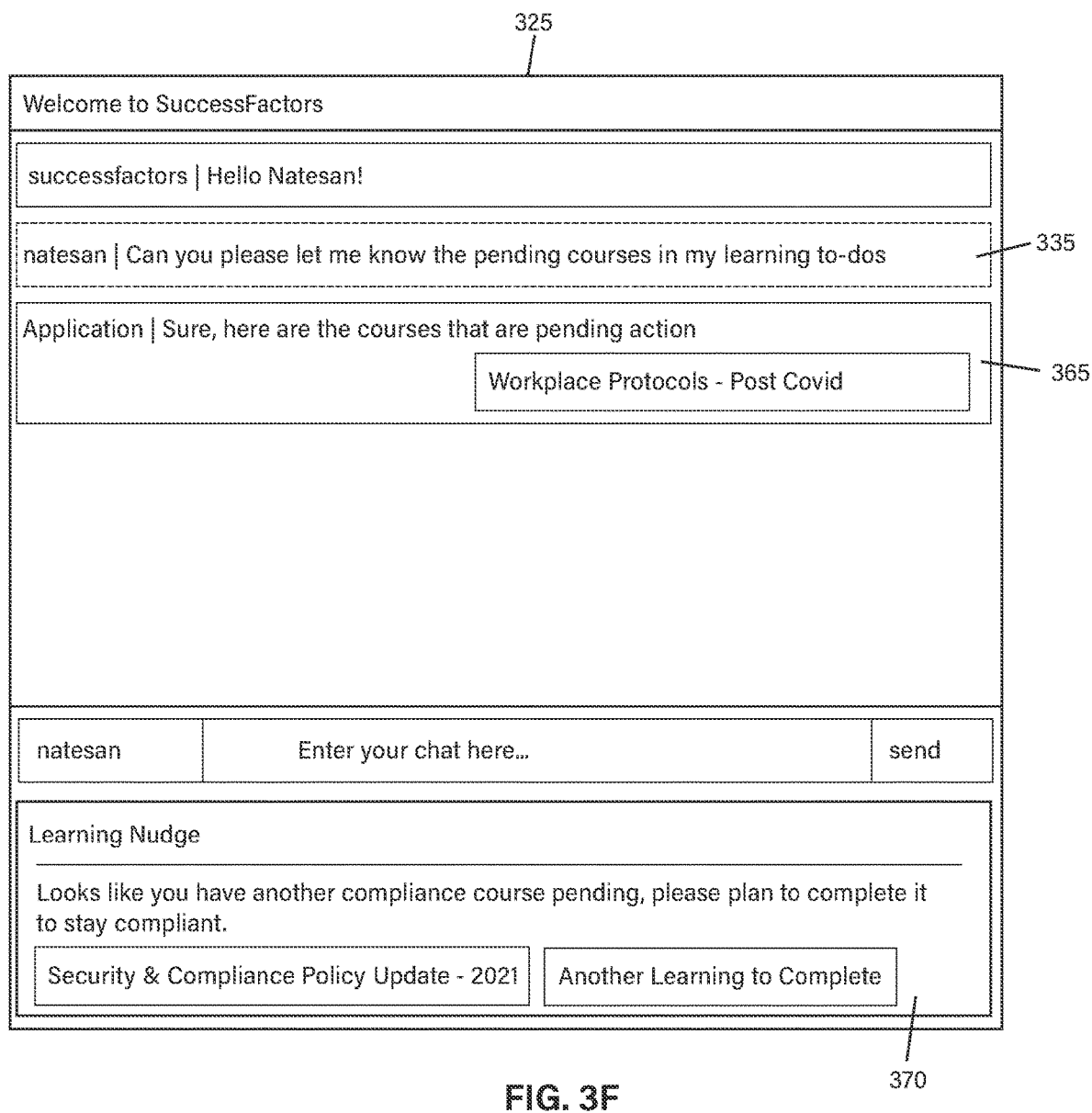
FIG. 3F shows an example of a chat server response that can be displayed on the chat interface of FIG. 3E after the different user enters the chat message on the chat interface and illustrates a nudge on the chat interface.

FIG. 3E shows a chat interface 325 with another user that is different from the user that initiated the client request in operation 210 (described in Example IV) but in the user cohort determined in operation 260. In this case, the different user asks a question, which is displayed at 335. FIG. 3F shows the chat interface 325 with the response of the chat server displayed at 365. A learning nudge 370 is also displayed to proactively nudge the user about another task that needs to be completed. The response of the chat server can be displayed on the chat interface 325 before the learning nudge 370 is displayed, or vice versa.

Figure 3G:
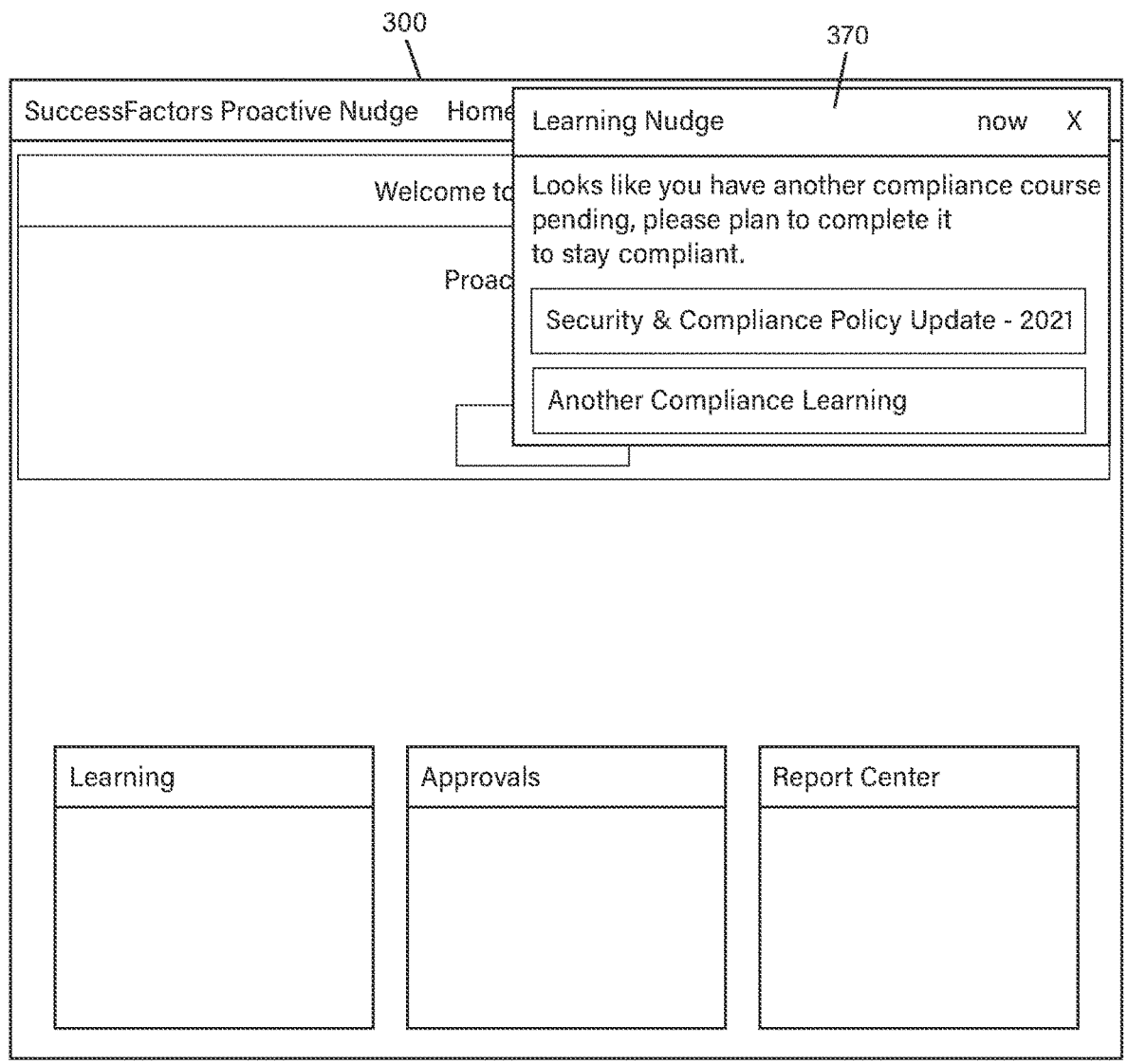
FIG. 3G shows an example of a nudge presented in a client interface that is not a chat interface.

FIG. 3G shows that the learning nudge 370 can be displayed to the different user without the user asking the chat server a question and outside of the chat interface. For example, the learning nudge 370 is displayed on the landing page 300 of the nudging application. The learning nudge 370 can be displayed in response to the nudge client embedded in the client interface polling the chat server for messages and can be based on the user at the client interface.

In some examples, the method can determine whether a nudge should be initiated after a server response has been transmitted to the chat client. For example, consider the case where a request for pending courses to be completed is received from the chat client. From the tokenized request, the nudge processor can determine that the server response involves a list of pending courses. The nudge processor can perform the action indicated by the tokenized request. For example, the nudge processor can request the list of pending courses from the system that holds the course information. The nudge processor can determine from the number of courses on the list and from the server response whether another action is possible. For example, if the list of pending courses holds only one course, and the server response includes the one course, then nudging is not needed. If the list of pending courses holds more than one pending course and only one course was conveyed to the chat client as part of the server response, the nudge processor can initiate a nudge for the remaining pending courses. The nudge processor can determine the validity of a token-to-action mapping in cases where the tokenized request includes tokens such as "check", "list" or "get" that can indicate that the result of performing the action will include a list of items.

The method 200b can be illustrated from alternative perspectives, e.g., from a perspective of an end user, which can be a human or a computer system or a process. The method 200b or any methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

Example VI—Proactive Nudging

In any of the examples herein, nudging can be proactive in that a reminder is sent about a task before the task is due to be completed. Such an approach can encourage compliance and meeting goals rather than merely letting due dates pass and trying to catch up.

Example VII—User Identifiers

A goal of the nudges can be to urge users to complete tasks. In practice, the system can internally represent a user as a user identifier. Thus, the terms are sometimes used interchangeably herein.

Example VIII—Method of Proactive Nudging with Reinforcement

Figure 4:
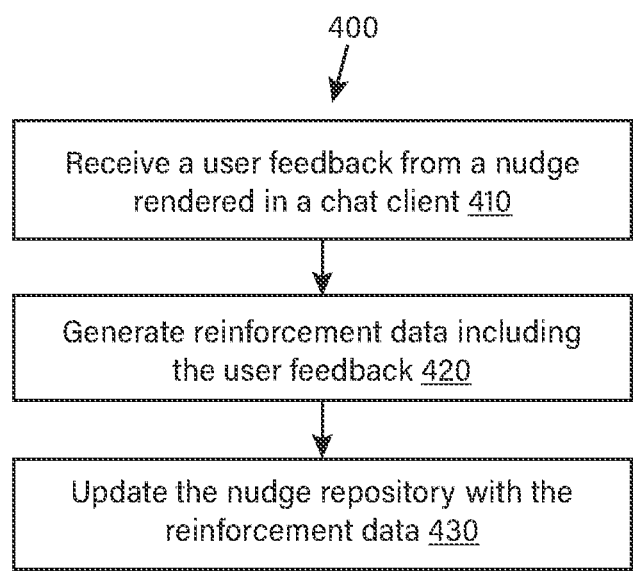
FIG. 4 is a flowchart of a method of proactive nudging with reinforcement.

FIG. 4 is a flowchart of an example method 400 of reinforcing nudges. The method can be implemented using the system 100 in FIG. 1. Prior to the method 400, a nudge can be rendered on a chat client as described in method 300.

At 410, a user feedback is received at the chat server from a nudge rendered in a chat client. The user feedback is received from the chat client or other client interface where a nudge is rendered. In one example, a user can provide feedback on the nudge at the nudge client. For example, the user can answer questions posed by the nudge client and/or interact with a nudge rendered by the nudge client. An example of a question asking for user feedback on a nudge is illustrated at 364 in FIG. 3D. The nudge client can periodically send the user feedback, via the chat client, to the chat server. The nudge initiator at the chat server can receive the user feedback and send the user feedback to the nudge processor.

At 420, reinforcement data is generated from the user feedback. In one example, the nudge processor can receive the user feedback from the nudge initiator. The nudge processor can determine whether the user feedback is positive (which means that the nudge was successful) or negative (which means that the nudge was not successful). The nudge processor can generate reinforcement data including the value of the user feedback (e.g., whether positive or negative) and user identifying information. The reinforcement data can include other data from the nudge processor, such as the tokens and nudge action associated with the user feedback.

At 430, the reinforcement data is used to update the nudge repository. For example, the machine learning training set processor can use the reinforcement data and other data to determine a new weight for a user cohort associated with the nudge action or to create a new user cohort for the nudge action. For example, if the reinforcement data indicates that a nudge action is useful (based on user feedback), the machine learning training set processor can increment the weight associated with the user cohort. On the other hand, if the reinforcement data indicates that a nudge action is not useful, the machine learning training set processor can decrease the weight of the user cohort. The machine learning training set processor can derive a new cohort based on the feedback and the user providing the feedback. For example, if the reinforcement data indicates that a nudge action is useful, the machine learning training set processor can analyze the profile and relationships of the user giving the feedback and use the analysis to generate one or more new cohorts to match with the nudge action.

Example IX—Computing Systems

Figure 5:
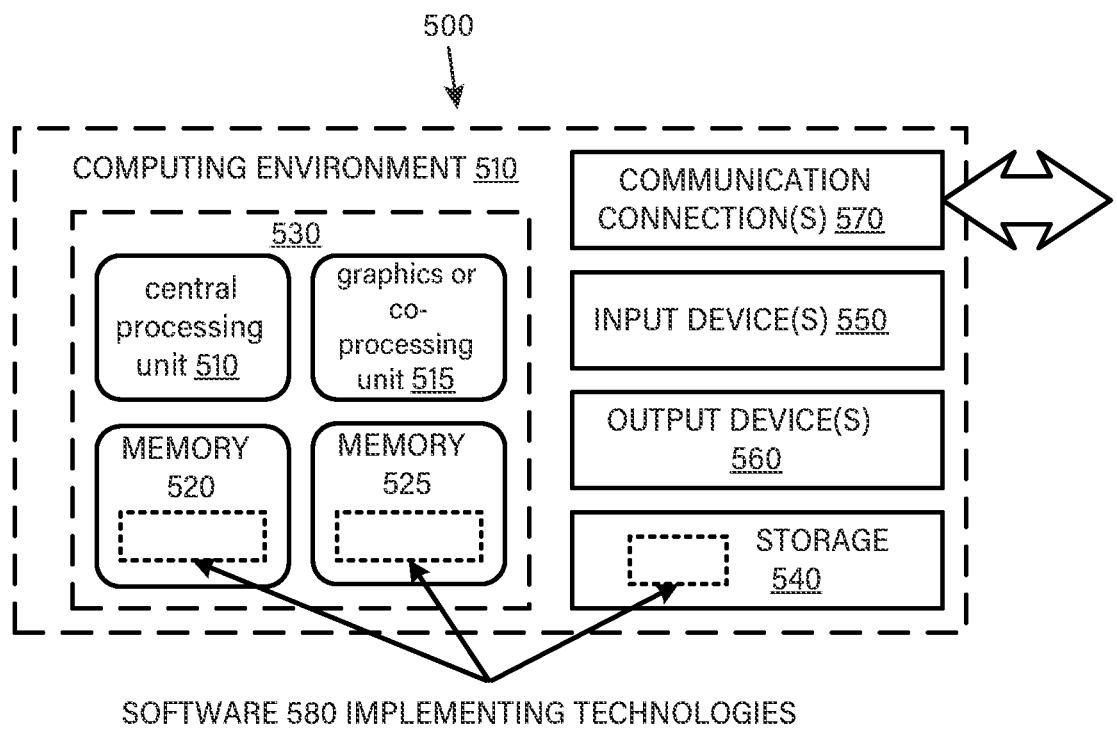
FIG. 5 is a block diagram of an example computing system in which described technologies can be implemented.

FIG. 5 depicts an example of a suitable computing system 500 in which the described innovations can be implemented. The computing system 500 is not intended to suggest any limitation as to scope of use or functionality of the present disclosure, as the innovations can be implemented in diverse computing systems.

With reference to FIG. 5, the computing system 500 includes one or more processing units 510, 515 and memory 520, 525. In FIG. 5, this basic configuration 530 is included within a dashed line. The processing units 510, 515 execute computer-executable instructions, such as for implementing the features described in the examples herein. A processing unit can be a general-purpose central processing unit (CPU), processor in an application-specific integrated circuit (ASIC), graphics processing unit (GPU), tensor processing unit (TPU), quantum processor, or any other type of processor. In a multi-processing system, multiple processing units execute computer-executable instructions to increase processing power. For example, FIG. 5 shows a central processing unit 510 as well as a graphics processing unit or co-processing unit 515. The tangible memory 520, 525 can be volatile memory (e.g., registers, cache, RAM), nonvolatile memory (e.g., ROM, EEPROM, flash memory, etc.), or some combination of the two, accessible by the processing unit(s) 510, 515. The memory 520, 525 stores software 580 implementing one or more innovations described herein, in the form of computer-executable instructions suitable for execution by the processing unit(s) 510, 515.

A computing system 500 can have additional features. For example, the computing system 500 includes storage 540, one or more input devices 550, one or more output devices 560, and one or more communication connections 570, including input devices, output devices, and communication connections for interacting with a user. An interconnection mechanism (not shown) such as a bus, controller, or network interconnects the components of the computing system 500. Typically, operating system software (not shown) provides an operating environment for other software executing in the computing system 500, and coordinates activities of the components of the computing system 500.

The tangible storage 540 can be removable or non-removable, and includes magnetic disks, magnetic tapes or cassettes, CD-ROMs, DVDs, or any other medium which can be used to store information in a non-transitory way and which can be accessed within the computing system 500. The storage 540 stores instructions for the software 580 implementing one or more innovations described herein.

The input device(s) 550 can be an input device such as a keyboard, mouse, pen, or trackball, a voice input device, a scanning device, touch device (e.g., touchpad, display, or the like) or another device that provides input to the computing system 500. The output device(s) 560 can be a display, printer, speaker, CD-writer, or another device that provides output from the computing system 500, e.g., actuators or some mechanical devices like motors, 3D printers, and the like.

The communication connection(s) 570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example X—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example XI—Cloud Computing Environment

Figure 6:
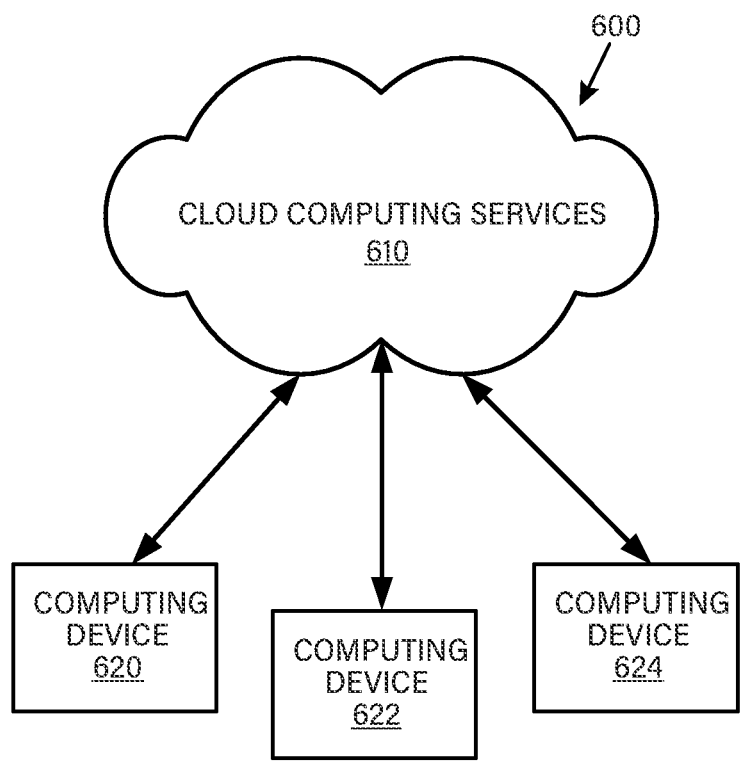
FIG. 6 is a block diagram of an example cloud computing environment that can be used in conjunction with the technologies described herein

FIG. 6 depicts an example cloud computing environment 600 in which the described technologies can be implemented, including, e.g., the systems described herein. The cloud computing environment 600 comprises cloud computing services 610. The cloud computing services 610 can comprise various types of cloud computing resources, such as computer servers, data storage repositories, networking resources, etc. The cloud computing services 610 can be centrally located (e.g., provided by a data center of a business or organization) or distributed (e.g., provided by various computing resources located at different locations, such as different data centers and/or located in different cities or countries).

The cloud computing services 610 are utilized by various types of computing devices (e.g., client computing devices), such as computing devices 620, 622, and 624. For example, the computing devices (e.g., 620, 622, and 624) can be computers (e.g., desktop or laptop computers), mobile devices (e.g., tablet computers or smart phones), or other types of computing devices. For example, the computing devices (e.g., 620, 622, and 624) can utilize the cloud computing services 610 to perform computing operations (e.g., data processing, data storage, and the like).

In practice, cloud-based, on-premises-based, or hybrid scenarios can be supported.

ADDITIONAL EXAMPLES

Additional examples based on principles described herein are enumerated below. Further examples falling within the scope of the subject matter can be configured by, for example, taking one feature of an example in isolation, taking more than one feature of an example in combination, or combining one or more features of one example with one or more features of one or more other examples.

Example 1: A computer-implemented method comprises receiving, by a chat server, a client request from a client device communicating with the chat server, wherein the client request comprises a chat message from a current user identifier at the client device; generating a server response to the client request by the chat server, wherein generating the server response comprises generating a set of tokens from at least a portion of the client request; transmitting the server response to the client device; searching a nudge repository for a nudge action based on the set of tokens; in response to finding the nudge action, determining a user cohort to receive the nudge action, wherein the user cohort includes one or more user identifiers; generating a nudge request including the nudge action and the user cohort; transmitting the nudge request to the chat server; and deploying the nudge action from the chat server to one or more client devices associated with the one or more user identifiers, wherein the nudge action is rendered as a nudge at the one or more client devices.

Example 2: A computer-implemented method according to Example 1, further comprising providing a nudge client at the one or more client devices, wherein the nudge is rendered in the nudge client at the one or more client devices.

Example 3: A computer-implemented method according to Example 1 or 2, wherein transmitting the nudge request to the chat server comprises placing the nudge request on a nudge queue on the chat server.

Example 4: A computer-implemented method according to Example 3, wherein deploying the nudge action from the chat server to one or more client devices associated with one or more user identifiers in the user cohort comprises receiving a request for messages from a client interface, determining that a user identifier at the client interface is a member of the user cohort, and deploying the nudge action from the nudge queue to the client interface.

Example 5: A computer-implemented method according to Example 3, wherein deploying the nudge action from the chat server to one or more client devices associated with one or more user identifiers in the user cohort comprises automatically pushing the nudge action from the nudge queue to the one or more client devices.

Example 6: A computer-implemented method according to any one of Examples 1 to 5, wherein determining a user cohort to receive the nudge action comprises searching the nudge repository for a user cohort associated with the nudge action.

Example 7: A computer-implemented method according to Example 6, wherein searching the nudge repository for a user cohort associated with the nudge action produces multiple user cohorts associated with the nudge action, and further comprising selecting one of the multiple user cohorts as the user cohort to receive the nudge action based on the weights of the multiple user cohorts.

Example 8: A computer-implemented method according to any one of Examples 1 to 5, wherein determining a user cohort to receive the nudge action comprises generating the user cohort based on a profile and relationships of the current user identifier.

Example 9: A computer-implemented method according to any one of Examples 1 to 8, further comprising receiving a user feedback based on an interaction of a selected user identifier in the user cohort with the nudge action; and adjusting a weight of the user cohort based on the user feedback.

Example 10: A computer-implemented method according to any one of Examples 1 to 9, further comprising receiving a user feedback based on an interaction of a selected user identifier in the user cohort with the nudge action; and adjusting a composition of the user cohort based on the selected user identifier and the user feedback.

Example 11: A computer-implemented method according to any one of Examples 1 to 10, further comprising determining that the current user identifier is included in the user cohort prior to generating the nudge request.

Example 12: A computer-implemented method according to any one of Examples 1 to 11, further comprising determining that the one or more user identifiers in the user cohort have consented to receive nudges prior to generating the nudge request.

Example 13: A computer-implemented method according to any one of Examples 1 to 12, wherein the nudge action comprises an address to an executable task, and wherein the rendered nudge comprises a user interface element that, when selected, launches the executable task using the address.

Example 14: A computer-implemented method comprises receiving, by a chat server, a client request from a client device communicating with the chat server, wherein the client request comprises a chat message from a current user identifier at the client device; generating a server response to the client request by the chat server, wherein generating the server response comprises generating a set of tokens from at least a portion of the client request; transmitting the server response to the client device; searching a nudge repository for a nudge action based on the set of tokens; generating a nudge request including the nudge action and the current user identifier; transmitting the nudge request to the chat server; and deploying the nudge action from the chat server to the client device associated with the current user identifier, wherein the nudge action is rendered as a nudge at the client device associated with the current user identifier.

Example 15: A computer-implemented method according to Example 14, wherein the set of tokens is generated at the chat server.

Example 16: A computer-implemented method according to Example 14 or 15, further comprising receiving a subsequent client request at the chat server, tokenizing at least a portion of the subsequent client request to obtain a subsequent set of tokens, searching the nudge repository for a subsequent nudge action based on the subsequent set of tokens, and, in response to not finding the subsequent nudge action, storing the subsequent set of tokens in the nudge repository.

Example 17: A computer-implemented method according to Example 16, further comprising determining one or more nudge actions to map to the subsequent set of tokens based on a server response of the chat server to the subsequent client request.

Example 18: A computer-implemented method according to any one of Examples 14 to 17, further comprising including a selectable link in the nudge request, wherein the selectable link is renderable as a user interface element that, when selected, launches an executable task associated with the nudge action.

Example 19: A computer-implemented method according to any one of Examples 14 to 18, wherein the nudge repository comprises token-to-action mappings that map stored tokens to nudge actions, wherein searching the nudge repository for the nudge action comprises searching the nudge repository for a token-to-action mapping having stored tokens that match the set of tokens, and further comprising determining the nudge action from the token-to-action mapping.

Example 20: A computing system comprising a chat server configured to receive a client request and tokenize at least a portion of the client request to obtain a set of tokens; a nudge repository configured to store tokens, mappings between tokens and nudge actions, and user cohorts associated with nudge actions; one or more processing units coupled to memory; and one or more computer-readable storage media storing instructions that when executed by the computing system cause the computing system to perform operations. The operations comprise intercepting the client request received at the chat server; obtaining the set of tokens generated from the client request from the chat server; searching the nudge repository for a nudge action based on the set of tokens; in response to finding the nudge action, determining a user cohort to receive the nudge action; generating a nudge request including the nudge action and the user cohort; transmitting the nudge request to the chat server; deploying the nudge action from the chat server to one or more client computers associated with one or more user identifiers in the user cohort; and rendering nudges representing the nudge action at the one or more client computers.

Example Implementation

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example Alternatives

The technology has been described with a selection of implementations and examples, but these preferred implementations and examples are not to be taken as limiting the scope of the technology since many other implementations and examples are possible that fall within the scope of the disclosed technology. The scope of the disclosed technology includes what is covered by the scope and spirit of the following claims.

The invention claimed is:

1. A computer-implemented method comprising:
receiving, by a chat server, a client request from a client device communicating with the chat server, wherein the client request comprises a chat message from a current user identifier at the client device;
generating a server response to the client request comprising the chat message by the chat server, wherein generating the server response comprises generating a set of tokens from at least a portion of the client request comprising the chat message;
transmitting the server response to the client device, wherein the server response is based on the set of tokens generated from the portion of the client request comprising the chat message and is rendered in a chat interface at the client device;
searching a nudge repository for a nudge action based on the set of tokens generated from the portion of the client request received by the chat server, wherein the nudge repository is configured to store tokens, nudge actions, user cohorts of users, and mappings between tokens and nudge actions, wherein the user cohorts are stored in association with nudge actions stored within the mappings;
in response to finding the nudge action based on the set of tokens generated from the portion of the client request received by the chat server, determining, via the mappings of the nudge repository, a user cohort to receive the nudge action, wherein the user cohort includes one or more user identifiers different from the current user identifier from which the chat message was received;
generating a nudge request including the nudge action and the user cohort, whereby the nudge request is based on the set of tokens generated from the portion of the client request comprising the chat message;

transmitting the nudge request based on the set of tokens generated from the portion of the client request comprising the chat message to the chat server;

deploying the nudge action from the chat server to the client device associated with the current user identifier from which the chat message was received, wherein a first nudge is rendered alongside the rendered server response in the chat interface at the client device based on the nudge action; and deploying the nudge action from the chat server to one or more client devices associated with the one or more user identifiers different from the current user identifier from which the chat message was received, wherein a second nudge is rendered at the one or more client devices associated with the one or more user identifiers different from the current user identifier from which the chat message was received based on the nudge action, the second nudge being rendered outside of a chat interface at the one or more client devices associated with the one or more user identifiers different from the current user identifier from which the chat message was received;

wherein both the first nudge and the second nudge are rendered responsive to the client request comprising the chat message; and both the server response and the first nudge are based on the set of tokens generated from the portion of the client request comprising the chat message.

2. The computer-implemented method of claim 1, further comprising providing a nudge client at the one or more client devices, wherein the second nudge is rendered in the nudge client at the one or more client devices.

3. The computer-implemented method of claim 1, wherein transmitting the nudge request to the chat server comprises placing the nudge request on a nudge queue on the chat server.

4. The computer-implemented method of claim 3, wherein deploying the nudge action from the chat server to the one or more client devices associated with the one or more user identifiers different from the current user identifier from which the chat message was received comprises receiving a request for messages from a client interface, determining that a user identifier at the client interface is a member of the user cohort, and deploying the nudge action from the nudge queue to the client interface.

5. The computer-implemented method of claim 3, wherein deploying the nudge action from the chat server to the one or more client devices associated with the one or more user identifiers different from the current user identifier from which the chat message was received comprises automatically pushing the nudge action from the nudge queue to the one or more client devices.

6. The computer-implemented method of claim 1, wherein determining, via the mappings of the nudge repository, the user cohort to receive the nudge action comprises searching the nudge repository for a user cohort associated with the nudge action.

7. The computer-implemented method of claim 6, wherein searching the nudge repository for a user cohort associated with the nudge action produces multiple user cohorts associated with the nudge action, and further comprising selecting one of the multiple user cohorts as the user cohort to receive the nudge action based on weights of the multiple user cohorts.

8. The computer-implemented method of claim 1, wherein determining a user cohort to receive the nudge action comprises generating the user cohort based on a profile and relationships of the current user identifier.

9. The computer-implemented method of claim 1, further comprising:
receiving a user feedback based on an interaction of a selected user identifier in the user cohort with the nudge action; and
adjusting a weight of the user cohort based on the user feedback.

10. The computer-implemented method of claim 1, further comprising:
receiving a user feedback based on an interaction of a selected user identifier in the user cohort with the nudge action; and
adjusting a composition of the user cohort based on the selected user identifier and the user feedback.

11. The computer-implemented method of claim 1, further comprising determining that the current user identifier is included in the user cohort prior to generating the nudge request.

12. The computer-implemented method of claim 1, further comprising determining that the one or more user identifiers different from the current user identifier from which the chat message was received have consented to receive nudges prior to generating the nudge request.

13. The computer-implemented method of claim 1, wherein the nudge action comprises an address to an executable task, and wherein the rendered first nudge comprises a user interface element that, when selected, launches the executable taskusing the address.

14. A computing system comprising:
one or more processing units coupled to memory; and
one or more computer-readable storage media storing instructions that when executed by the computing system cause the computing system to perform operations comprising:
receiving, by a chat server, a client request from a client device communicating with the chat server, wherein the client request comprises a chat message from a current user identifier at the client device;
generating a server response to the client request comprising the chat message by the chat server, wherein generating the server response comprises generating a set of tokens from at least a portion of the client request comprising the chat message;
transmitting the server response to the client device, wherein the server response is based on the set of tokens generated from the portion of the client request comprising the chat message and is rendered in a chat interface at the client device;
searching a nudge repository for a nudge action based on the set of tokens generated from the portion of the client request received by the chat server, wherein the nudge repository is configured to store tokens, nudge actions, user cohorts of users, and mappings between tokens and nudge actions, wherein the user cohorts are stored in association with nudge actions stored within the mappings;
in response to finding the nudge action based on the set of tokens generated from the portion of the client request received by the chat server, determining, via the mappings of the nudge repository, a user cohort to receive the nudge action, wherein the user cohort includes one or more user identifiers different from the current user identifier from which the chat message was received;
generating a nudge request including the nudge action and the user cohort, whereby the nudge request is based on the set of tokens generated from the portion of the client request comprising the chat message;

transmitting the nudge request based on the set of tokens generated from the portion of the client request comprising the chat message to the chat server;

deploying the nudge action from the chat server to the client device associated with the current user identifier from which the chat message was received, wherein a first nudge is rendered alongside the rendered server response in the chat interface at the client device based on the nudge action; and deploying the nudge action from the chat server to one or more client devices associated with the one or more user identifiers different from the current user identifier from which the chat message was received, wherein a second nudge is rendered at the one or more client devices associated with the one or more user identifiers different from the current user identifier from which the chat message was received based on the nudge action, the second nudge being rendered outside of a chat interface at the one or more client devices associated with the one or more user identifiers different from the current user identifier from which the chat message was received;

wherein both the first nudge and the second nudge are rendered responsive to the client request comprising the chat message; and both the server response and the first nudge are based on the set of tokens generated from the portion of the client request comprising the chat message.

15. The system of claim 14, wherein the operations further comprise:

receiving a subsequent client request at the chat server, tokenizing at least a portion of the subsequent client request to obtain a subsequent set of tokens, searching the nudge repository for a subsequent nudge action based on the subsequent set of tokens, and, in response to not finding the subsequent nudge action, storing the subsequent set of tokens in the nudge repository.

16. The system of claim 15, wherein the operations further comprise:

determining one or more nudge actions to map to the subsequent set of tokens based on a server response of the chat server to the subsequent client request.

17. The system of claim 14, wherein the nudge repository comprises token-to-action mappings that map stored tokens to nudge actions, wherein searching the nudge repository for the nudge action comprises searching the nudge repository for a token-to-action mapping having stored tokens that match the set of tokens, and the operations further comprise determining the nudge action from the token-to-action mapping.

18. The computer-implemented method of claim 1, wherein:

the chat message is about a first topic;
the first nudge is related to a second topic;
the second nudge is related to the same, second topic; and
the first topic is different from the second topic;
wherein both the first nudge about the second topic and the second nudge about the second topic are generated responsive to the chat message about the first topic.

19. The system of claim 14, wherein the set of tokens is generated at the chat server.

20. One or more non-transitory computer-readable media having encoded thereon computer-executable instructions that, when executed by a computing system, cause the computing system to perform:

receiving, by a chat server, a client request from a client device communicating with the chat server, wherein the client request comprises a chat message from a current user identifier at the client device;

generating a server response to the client request comprising the chat message by the chat server, wherein generating the server response comprises generating a set of tokens from at least a portion of the client request comprising the chat message;

transmitting the server response to the client device, wherein the server response is based on the set of tokens generated from the portion of the client request comprising the chat message and is rendered in a chat interface at the client device;

searching a nudge repository for a nudge action based on the set of tokens generated from the portion of the client request received by the chat server, wherein the nudge repositoryis configured to store tokens, nudge actions, user cohorts of users, and mappings between tokens and nudge actions, wherein the user cohorts are stored in association with nudge actions stored within the mappings;

in response to finding the nudge action based on the set of tokens generated from the portion of the client request received by the chat server, determining, via the mappings of the nudge repository, a user cohort to receive the nudge action, wherein the user cohort includes one or more user identifiers different from the current user identifier from which the chat message was received;

generating a nudge request including the nudge action and the user cohort, whereby the nudge request is based on the set of tokens generated from the portion of the client request comprising the chat message;

transmitting the nudge request based on the set of tokens generated from the portion of the client request comprising the chat message to the chat server;

deploying the nudge action from the chat server to the client device associated with the current user identifier from which the chat message was received, wherein a first nudge is rendered alongside the rendered server response in the chat interface at the client device based on the nudge action; and deploying the nudge action from the chat server to one or more client devices associated with the one or more user identifiers different from the current user identifier from which the chat message was received, wherein a second nudge is rendered at the one or more client devices associated with the one or more user identifiers different from the current user identifier from which the chat message was received based on the nudge action, the second nudge being rendered outside of a chat interface at the one or more client devices associated with the one or more user identifiers different from the current user identifier from which the chat message was received;

wherein both the first nudge and the second nudge are rendered responsive to the client request comprising the chat message; and both the server response and the first nudge are based on the set of tokens generated from the portion of the client request comprising the chat message.

* * * * *